United States Patent
Suzuki et al.

(10) Patent No.: US 10,904,873 B2
(45) Date of Patent: Jan. 26, 2021

(54) TERMINAL APPARATUS, COMMUNICATION METHOD, AND INTEGRATED CIRCUIT

(71) Applicants: Sharp Kabushiki Kaisha, Sakai (JP); FG Innovation Company Limited, Tuen Mun (HK)

(72) Inventors: Shoichi Suzuki, Sakai (JP); Wataru Ouchi, Sakai (JP); Tomoki Yoshimura, Sakai (JP); Liqing Liu, Sakai (JP); Kimihiko Imamura, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 58 days.

(21) Appl. No.: 16/334,396

(22) PCT Filed: Aug. 29, 2017

(86) PCT No.: PCT/JP2017/031019
§ 371 (c)(1),
(2) Date: Mar. 19, 2019

(87) PCT Pub. No.: WO2018/055997
PCT Pub. Date: Mar. 29, 2018

(65) Prior Publication Data
US 2019/0223162 A1   Jul. 18, 2019

(30) Foreign Application Priority Data

Sep. 21, 2016 (JP) .................................. 2016-183903

(51) Int. Cl.
*H04W 72/04* (2009.01)
*H04W 76/28* (2018.01)
(Continued)

(52) U.S. Cl.
CPC ......... *H04W 72/042* (2013.01); *H04W 52/02* (2013.01); *H04W 72/04* (2013.01); (Continued)

(58) Field of Classification Search
CPC .................................................. H04W 72/042
See application file for complete search history.

(56) References Cited

U.S. PATENT DOCUMENTS

2015/0271806 A1* 9/2015 Kim .................. H04W 72/0413
455/452.1
2016/0254901 A1  9/2016 You et al.
(Continued)

FOREIGN PATENT DOCUMENTS

WO       2016/072495 A1    5/2016

OTHER PUBLICATIONS

Official Communication issued in International Patent Application No. PCT/JP2017/031019, dated Oct. 24, 2017.
(Continued)

*Primary Examiner* — John D Blanton
(74) *Attorney, Agent, or Firm* — ScienBiziP, P.C.

(57) ABSTRACT

A terminal apparatus for performing discontinuous reception (DRX) at least monitors both a PDCCH for C-RNTI and a PDCCH for CC-RNTI for a DRX-related active time and monitors a PDCCH for CC-RNTI in a period of a CC-RNTI monitoring window. The CC-RNTI monitoring window is started in a subframe n−X+1, and in a case that a second PDCCH is detected in a subframe n−X+v or a subframe up to the subframe n−X+v, the CC-RNTI monitoring window is ended in the subframe n in which the second PDCCH is detected, or in a case that the second PDCCH is not detected in the subframe n−X+v or the subframe up to the subframe n−X+v, the CC-RNTI monitoring window is ended in the subframe n−X+v.

4 Claims, 12 Drawing Sheets

(51) Int. Cl.
*H04W 52/02* (2009.01)
*H04W 72/12* (2009.01)

(52) U.S. Cl.
CPC ............ *H04W 72/12* (2013.01); *H04W 76/28* (2018.02); *Y02D 30/70* (2020.08)

(56) References Cited

U.S. PATENT DOCUMENTS

| | | | |
|---|---|---|---|
| 2017/0347270 A1 | 11/2017 | Iouchi et al. | |
| 2018/0077643 A1* | 3/2018 | Dinan | H04W 72/0413 |
| 2019/0191441 A1* | 6/2019 | Kusashima | H04W 16/14 |
| 2020/0029270 A1* | 1/2020 | Matsuda | H04J 15/00 |

OTHER PUBLICATIONS

"3rd Generation Partnership Project; Technical Specification Group Radio Access Network; Evolved Universal Terrestrial Radio Access (E-UTRA); Physical channels and modulation (Release 13)", 3GPP TS 36.211 V13.1.0, Mar. 2016, pp. 1-155.

"3rd Generation Partnership Project; Technical Specification Group Radio Access Network; Evolved Universal Terrestrial Radio Access (E-UTRA); Multiplexing and channel coding (Release 13)", 3GPP TS 36.212 V13.1.0, Mar. 2016, pp. 1-129.

"3rd Generation Partnership Project; Technical Specification Group Radio Access Network; Evolved Universal Terrestrial Radio Access (E-UTRA0; Physical layer procedures (Release 13)", 3GPP TS 36.213 V13.1.1, Mar. 2016, pp. 1-361.

Ericsson et al., "New Work Item on enhanced LAA for LTE", 3GPP TSG RAN Meeting #70, RP-152272, Dec. 7-10, 2015, 8 pages.

Nokia et al., "On Two-Stage UL scheduling for eLAA", 3GPP TSG RAN WG1 Meeting #86, R1-167074, Aug. 22-26, 2016, 7 pages.

Motorola Mobility, "Introduction of eLAA (PHY layer aspects) in 36.213", 3GPP TSG-RAN WG1 Meeting #86, R1-168220, Aug. 22-26, 2016, 4 pages.

Huawei et al., "Impact on HARQ and DRX of Two-stage scheduling", 3GPP TSG-RAN WG2 Meeting #95bis, R2-166460, Oct. 10-14, 2016, 5 pages.

Ericsson, "Report from [95bis#07][LET/eLAA] MAC impact of 2 step granting", 3GPP TSG-RAN WG2 #96, Tdoc R2-168362, Nov. 14-18, 2016, pp. 1-14.

* cited by examiner

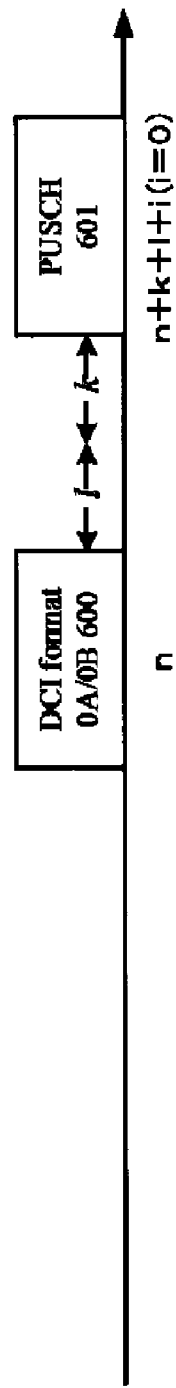
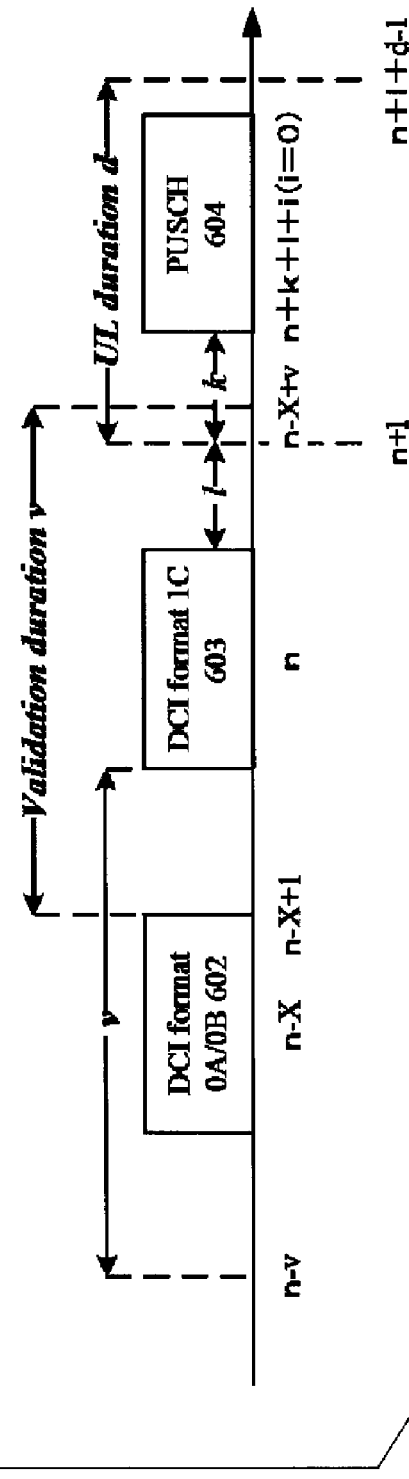

TERMINAL APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority for JP 2016-183903 filed on Sep. 21, 2016, the contents of which are incorporated herein by reference.

BACKGROUND ART

A radio access method and a radio network for cellular mobile communications (hereinafter, referred to as "Long Term Evolution (LTE: Registered Trademark)", or "Evolved Universal Terrestrial Radio Access (EUTRA)") have been studied in the 3rd Generation Partnership Project (3GPP). In LTE, a base station apparatus is also referred to as an evolved NodeB (eNodeB), and a terminal apparatus is also referred to as a User Equipment (UE). LTE is a cellular communication system in which multiple areas are deployed in a cellular structure, with each of the multiple areas being covered by a base station apparatus. A single base station apparatus may manage multiple cells.

In LTE release 13, carrier aggregation has been specified which is a technique to allow a terminal apparatus to perform simultaneous transmission and/or reception in multiple serving cells (component carriers) (NPL 1, 2, and 3). In LTE release 14, an extension to Licensed Assisted Access (LAA) and carrier aggregation using an uplink carrier in an unlicensed band have been studied (NPL 4). In NPL 5, it is stated that PUSCH transmission can be performed after having received a triggering grant in a subframe later than a subframe to transmit an initial uplink grant. In NPL 5, all PUSCH information (such as RA, MCS) is included in an initial uplink grant.

CITATION LIST

Non Patent Literature

NPL 1: "3GPP TS 36.211 V13.1.0 (2016-03)", 29 Mar. 2016.
NPL 2: "3GPP TS 36.212 V13.1.0 (2016-03)", 29 Mar. 2016.
NPL 3: "3GPP TS 36.213 V13.1.1 (2016-03)", 31 Mar. 2016.
NPL 4: "New Work Item on enhanced LAA for LTE", RP-152272, Ericsson, Huawei, 3GPP TSG RAN Meeting #70, Sitges, Spain, 7-10 Dec. 2015.
NPL 5: "On Two-Stage UL scheduling for eLAA", R1-167074, Nokia, Alcatel-Lucent Shanghai Bell, 3GPP TSG RAN1 Meeting #86, Gothenburg, Sweden, 22-26 Aug. 2016.

SUMMARY OF INVENTION

Technical Problem

One aspect of the present invention provides a terminal apparatus capable of efficiently monitoring the downlink, a base station apparatus communicating with the terminal apparatus, a communication method used for the terminal apparatus, a communication method used for the base station apparatus, an integrated circuit implemented on the terminal apparatus, and an integrated circuit implemented on the base station apparatus.

Solution to Problem (1) According to some aspects of the present invention, the following measures are provided. Specifically, a first aspect of the present invention provides a terminal apparatus including: a transmitter configured to and/or programmed to transmit a physical uplink shared channel in a subframe n+k+l in a case that a first physical downlink control channel with first downlink control information is detected in a subframe n−X and a second physical downlink control channel with second downlink control information is detected in a subframe n, the first downlink control information including a 'PUSCH trigger A' field which is set to '1', the second downlink control information including a 'PUSCH trigger B' field which is set to a specific second value; and a medium access control layer processing unit configured to and/or programmed to perform discontinuous reception which controls monitoring activity of a physical downlink control channel for a cell radio network temporary identifier and a physical downlink control channel for a common control radio network temporary identifier, wherein the first physical downlink control channel is the physical downlink control channel for the cell radio network temporary identifier, the second physical downlink control channel is the physical downlink control channel for the common control radio network temporary identifier, during active time related to the discontinuous reception, at least both the physical downlink control channel for the cell radio network temporary identifier and the physical downlink control channel for the common control radio network temporary identifier are monitored by the terminal apparatus, during a common control radio network temporary identifier monitoring window except for the active time, the physical downlink control channel for the common control radio network temporary identifier is monitored by the terminal apparatus, the common control radio network temporary identifier monitoring window is started in a subframe n−X+1, the common control radio network temporary identifier monitoring window is ended in the subframe n in which the second physical downlink control channel is detected in a case that the second physical downlink control channel is detected in or until a subframe n−X+v, the common control radio network temporary identifier monitoring window is ended in the subframe n−X+v in a case that the second physical downlink control channel is not detected in or until the subframe n−X+v, and the v is given based on a 'Timing offset' field included in the first downlink control information.

(2) A second aspect of the present invention provides a communication method used for a terminal apparatus, the communication method including the steps of: transmitting a physical uplink shared channel in a subframe n+k+l in a case that a first physical downlink control channel with first downlink control information is detected in a subframe n−X and a second physical downlink control channel with second downlink control information is detected in a subframe n, the first downlink control information including a 'PUSCH trigger A' field which is set to '1', the second downlink control information including a 'PUSCH trigger B' field which is set to a specific second value; and performing discontinuous reception which controls monitoring activity of a physical downlink control channel for a cell radio network temporary identifier and a physical downlink control channel for a common control radio network temporary identifier, wherein the first physical downlink control channel is the physical downlink control channel for the cell radio network temporary identifier, the second physical downlink control channel is the physical downlink control channel for the common control radio network temporary identifier, during active time related to the discontinuous reception, at least both the physical downlink control channel for the cell radio network temporary identifier and the physical downlink control channel for the common control radio network temporary identifier are monitored, during a common control radio network temporary identifier monitoring window except for the active time, the physical downlink control channel for the common control radio network temporary identifier is monitored, the common control radio network temporary identifier monitoring window is started in a subframe n−X+1, the common control radio network temporary identifier monitoring window is ended in the subframe n in which the second physical downlink control channel is detected in a case that the second physical downlink control channel is detected in or until a subframe n−X+v, the common control radio network temporary identifier monitoring window is ended in the subframe n−X+v in a case that the second physical downlink control channel is not detected in or until the subframe n−X+v, and the v is given based on a 'Timing offset' field included in the first downlink control information.

Advantageous Effects of Invention

According to one aspect of the present invention, the terminal apparatus can efficiently monitor a downlink.

BRIEF DESCRIPTION OF DRAWINGS

FIGS. 6A and 6B are diagrams, each illustrating an example of a PUSCH scheduling according to the present embodiment.

DESCRIPTION OF EMBODIMENTS

Embodiments of the present invention will be described below.

Figure 1:
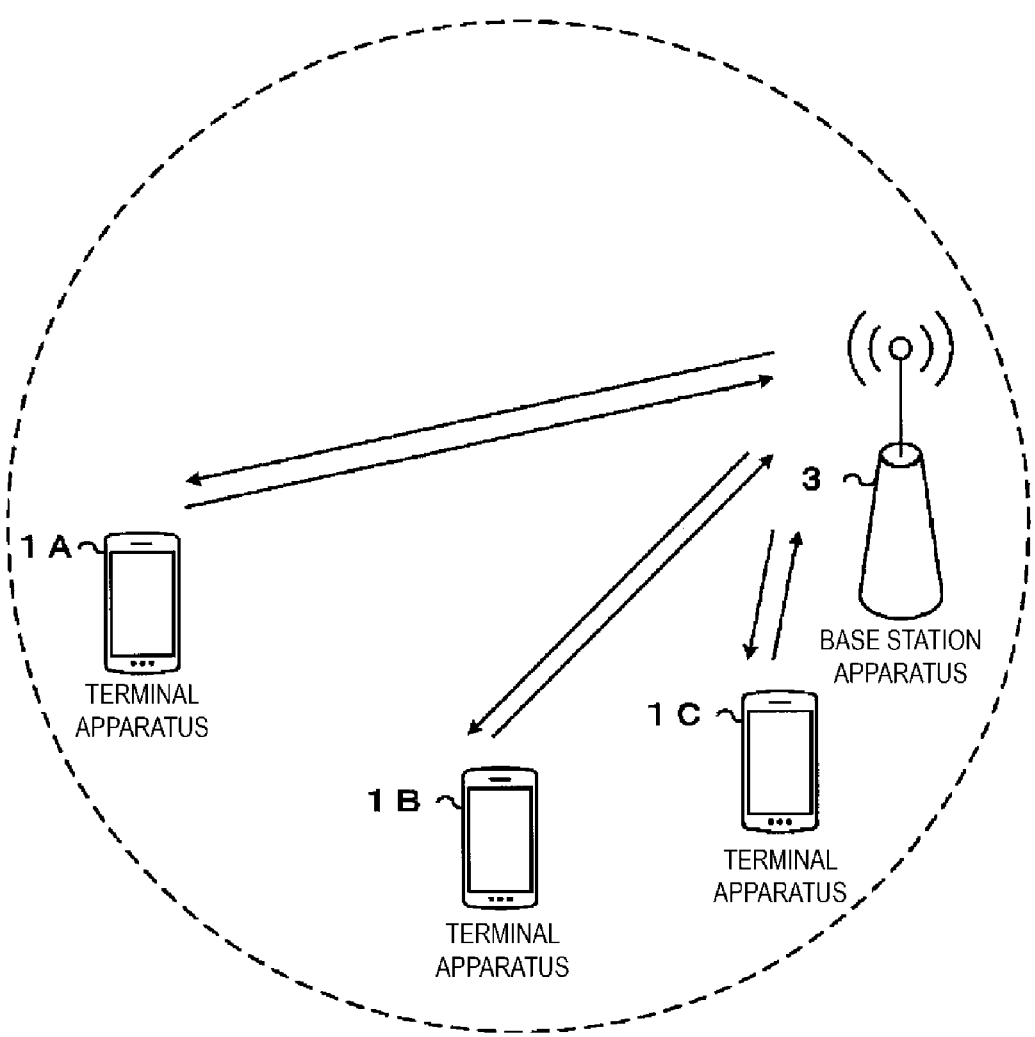
FIG. 1 is a conceptual diagram of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. Each of the terminal apparatuses 1A to 1C is referred to as a terminal apparatus 1.

Hereinafter, carrier aggregation will be described.

According to the present embodiment, multiple serving cells are configured for the terminal apparatus 1. A technology in which the terminal apparatus 1 communicates via the multiple serving cells is referred to as cell aggregation or carrier aggregation. One aspect of the present invention may be applied to each of the multiple serving cells configured for the terminal apparatus 1. Furthermore, one aspect of the present invention may be applied to some of the multiple serving cells configured. Furthermore, one aspect of the present invention may be applied to each of groups of the multiple serving cells configured. Furthermore, one aspect of the present invention may be applied to some of the groups of the multiple serving cells configured. The multiple serving cells include at least one primary cell. Here, the multiple serving cells may include at least one or multiple secondary cells. Here, the multiple serving cells may include one or multiple Licensed Assisted Access (LAA) cells. The LAA cell is referred to as a LAA secondary cell.

The primary cell is a serving cell in which an initial connection establishment procedure has been performed, a serving cell in which a connection re-establishment procedure has been started, or a cell indicated as a primary cell in a handover procedure. The secondary cell(s) and/or the LAA cell(s) may be configured at a point of time when or after a Radio Resource Control (RRC) connection is established. The primary cell may be included in a licensed band. The LAA cell may be included in an unlicensed band. The secondary cell may be included in any of a licensed band and an unlicensed band. The LAA cell may be referred to as a LAA secondary cell.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 can perform simultaneous transmission and/or reception on multiple physical channels in multiple serving cells (component carriers). A single physical channel is transmitted in a single serving cell (component carrier) out of the multiple serving cells (component carriers).

Physical channels and physical signals according to the present embodiment will be described.

In FIG. 1, in uplink radio communication from the terminal apparatus 1 to the base station apparatus 3, the following uplink physical channels are used. The uplink physical channels are used for transmitting information output from a higher layer.

Physical Uplink Shared Channel (PUSCH)

Physical Random Access Channel (PRACH)

The PUSCH is used for transmitting uplink data (Transport block, Uplink-Shared Channel: UL-SCH), Channel State Information (CSI) of downlink, and/or, Hybrid Automatic Repeat reQuest (HARQ-ACK). The CSI, as well as the HARQ-ACK, is Uplink Control Information (UCI).

The CSI includes a Channel Quality Indicator (CQI), a Rank Indicator (RI), and a Precoding Matrix Indicator (PMI). The CQI expresses a combination of a modulation scheme and a coding rate for a single transport block to be transmitted on the PDSCH. The RI indicates the number of valid layers determined by the terminal apparatus 1. The PMI indicates a codebook determined by the terminal apparatus 1. The codebook is related to the precoding of the PDSCH.

The HARQ-ACK corresponds to downlink data (Transport block, Medium Access Control Protocol Data Unit: MAC PDU, Downlink-Shared Channel: DL-SCH, Physical Downlink Shared Channel: PDSCH). The HARQ-ACK indicates an acknowledgement (ACK) or a negative-acknowledgement (NACK). The HARQ-ACK is also referred to as ACK/NACK, HARQ feedback, HARQ acknowledge, HARQ information, or HARQ control information.

The PRACH is used to transmit a random access preamble.

In FIG. 1, the following uplink physical signal is used in the uplink radio communication. The uplink physical signal is not used for transmitting information output from the higher layer, but is used by the physical layer.

Demodulation Reference Signal (DMRS)

The DMRS is associated with transmission of the PUSCH. The DMRS is time-multiplexed with the PUSCH. The base station apparatus 3 may use the DMRS in order to perform channel compensation of the PUSCH.

In FIG. 1, the following downlink physical channels are used for downlink radio communication from the base station apparatus 3 to the terminal apparatus 1. The downlink physical channels are used for transmitting information output from the higher layer.

Physical Downlink Control Channel (PDCCH)

Physical Downlink Shared Channel (PDSCH)

The PDSCH is used to transmit downlink data (Transport block, Downlink-Shared Channel (DL-SCH)).

The PDCCH is used to transmit Downlink Control Information (DCI). The downlink control information is also referred to as DCI format. The downlink control information includes an uplink grant and a downlink grant. The uplink grant may be used for scheduling a single PUSCH within a single cell. The uplink grant may be used for scheduling multiple PUSCHs in multiple consecutive subframes within a single cell. The uplink grant may be used for scheduling a single PUSCH within the fourth or later subframe from the subframe in which the uplink grant is transmitted. The downlink grant may be used for scheduling a single PDSCH within a single cell. The downlink grant is also referred to as a downlink assignment.

DCI format 0A may be used for scheduling the PUSCH in a LAA cell. DCI format 0B may be used for scheduling the PUSCH in each of multiple subframes in a LAA cell. Each of DCI format 0A and DCI format 0B includes an uplink grant. Each of DCI format 0A and DCI format 0B may include a 'PUSCH trigger A' field, and a 'Timing offset' field. Each of DCI format 0A and DCI format 0B may include scheduling information of the PUSCH. The scheduling information of the PUSCH may include information to indicate resource block allocation for the PUSCH, a transmission power control command for the PUSCH, information to indicate modulation scheme for the PUSCH, information to indicate sizes of transport blocks for the PUSCH.

DCI format 1A may be used for scheduling the PDSCH in a LAA cell. DCI format 1A includes a downlink grant.

DCI format 1C is used for LAA common information. The LAA common information may include 'Uplink transmission duration and offset indication' and/or 'PUSCH trigger B'. DCI format 1C does not include the above described scheduling information of the PUSCH.

Cyclic Redundancy Check (CRC) parity bits attached to the downlink control information transmitted in a single PDCCH may be scrambled with a Cell Radio Network Temporary Identifier (C-RNTI) or a Common Control Radio Network Temporary Identifier (CC-RNTI).

The C-RNTI is an identifier for identifying a terminal apparatus within a cell. The C-RNTI is used to control PDSCH transmission or PUSCH transmission in a single subframe. The C-RNTI is used for unicast transmission (PDSCH transmission or PUSCH transmission) scheduled dynamically. The base station apparatus 3 may transmit information used for determination of a C-RNTI in the terminal apparatus 1 to the terminal apparatus 1. The CRC parity bits attached to the DCI format (e.g., DCI format 0A, DCI format 0B, DCI format 1A, and the like) including an uplink grant or a downlink grant may be scrambled with the C-RNTI.

The CC-RNTI is used for LAA common information. A value of the CC-RNTI may be a predetermined value by a specification, and the like. The CRC parity bits attached to DCI format 1C used for the LAA common information may be scrambled with the CC-RNTI.

The UL-SCH and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU).

A non-synchronous HARQ may be applied to the PUSCH (UL-SCH) of the present embodiment.

A configuration of a radio frame according to the present embodiment will be described below.

Figure 2:
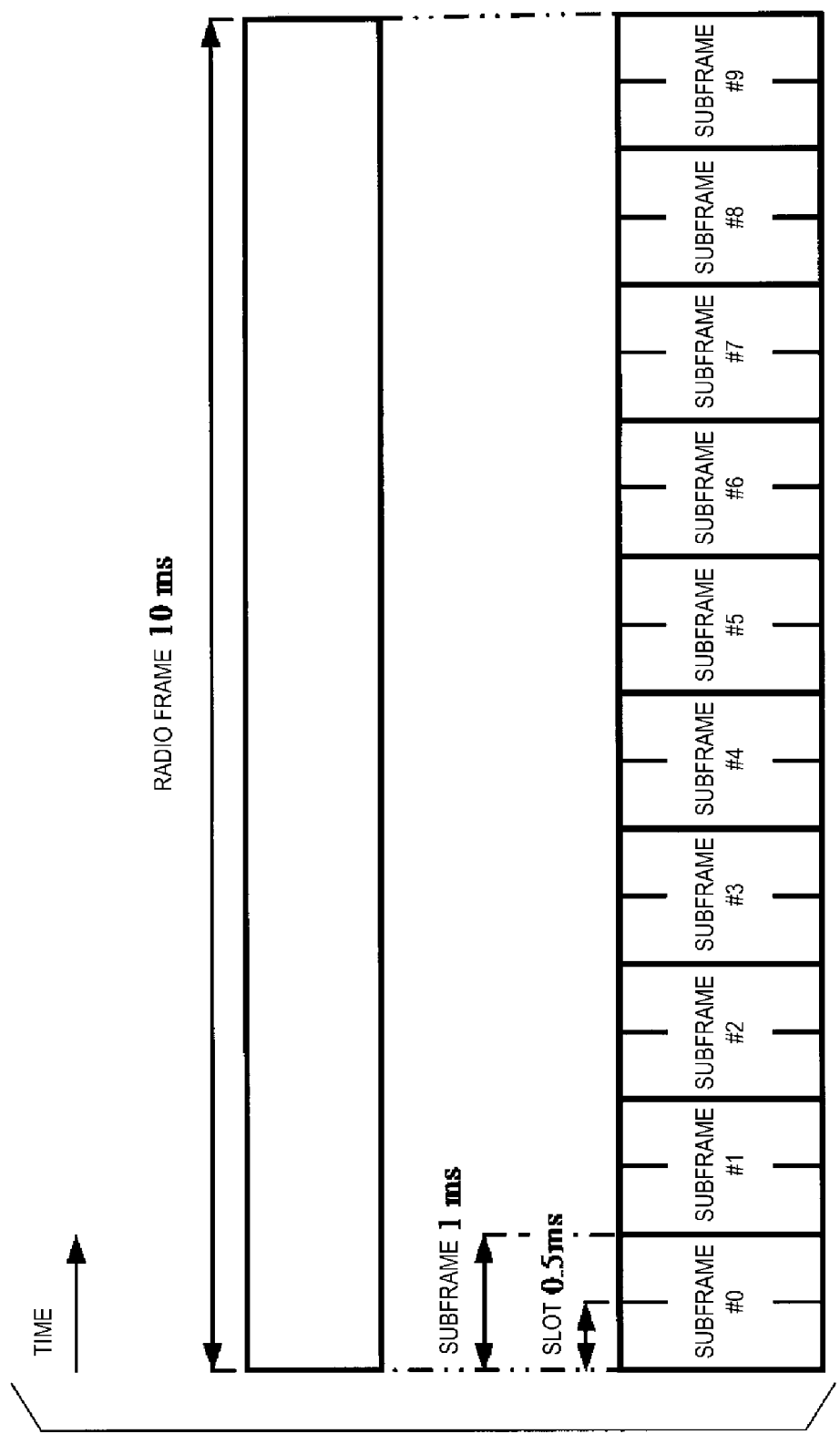
FIG. 2 is a diagram illustrating a schematic configuration of a radio frame according to the present embodiment.

FIG. 2 is a diagram illustrating a schematic configuration of the radio frame according to the present embodiment. In FIG. 2, the horizontal axis is a time axis. Each of radio frames is 10 ms in length. Furthermore, each of the radio frames is constituted of 10 subframes. Each of the subframes is 1 ms in length and is defined by two consecutive slots. Each of the slots is 0.5 ms in length. The i-th subframe within a radio frame is constituted of the (2×i)-th slot and the (2×i+1)-th slot. To be more precise, 10 subframes can be used at each interval of 10 ms.

Figure 3:
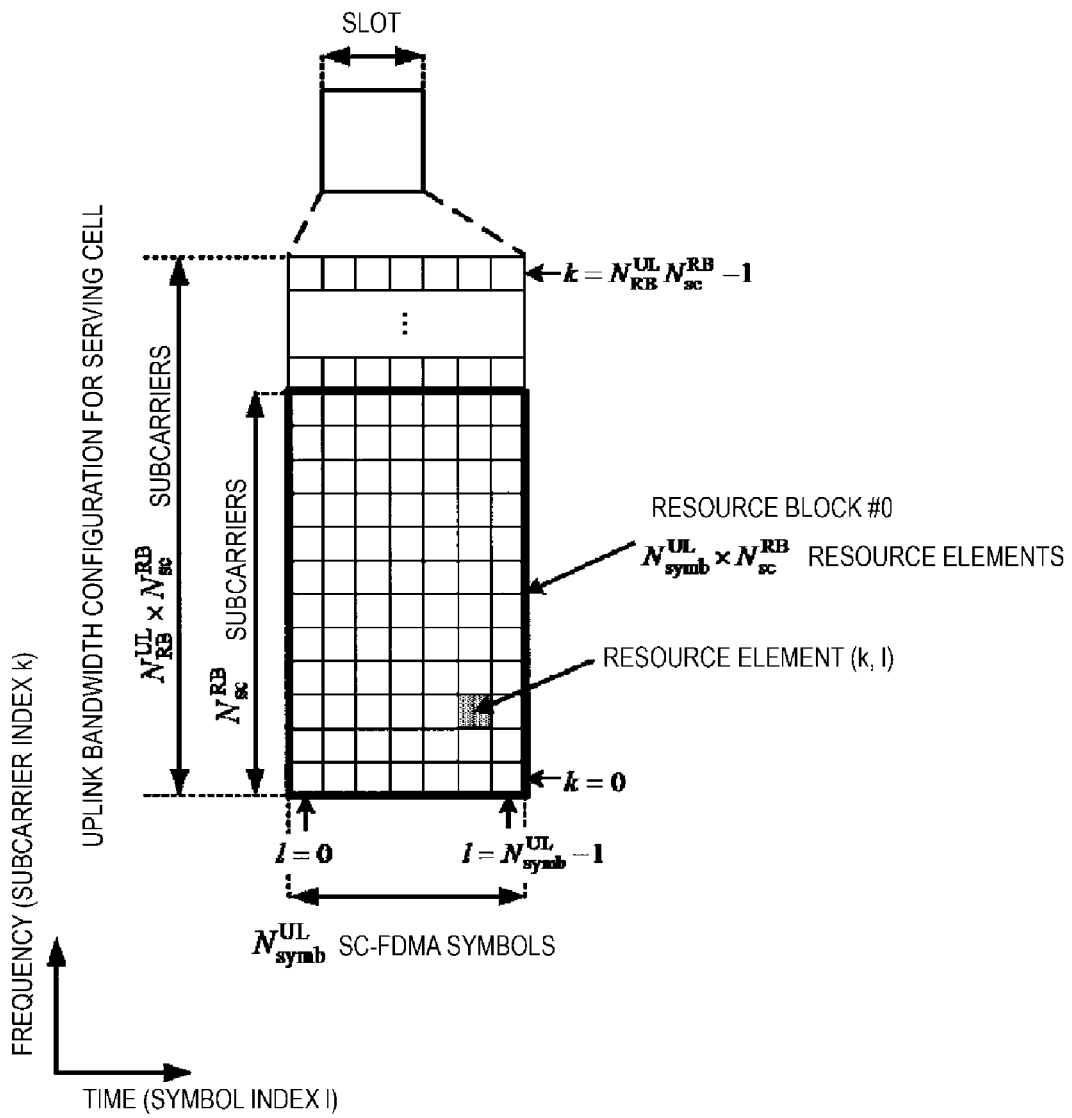
FIG. 3 is a diagram illustrating a schematic configuration of an uplink slot according to the present embodiment.

An example configuration of a slot according to the present embodiment will be described below. FIG. 3 is a diagram illustrating a schematic configuration of an uplink slot according to the present embodiment. FIG. 3 illustrates a configuration of a downlink slot in a cell. In FIG. 3, the horizontal axis is a time axis, and the vertical axis is a frequency axis. In FIG. 3, 1 is an SC-FDMA symbol number/index, and k is a subcarrier number/index.

The physical signal or the physical channel transmitted in each of the slots is expressed by a resource grid. In the uplink, the resource grid is defined by multiple subcarriers and multiple SC-FDMA symbols. Each element within the resource grid is referred to as a resource element. The resource element is expressed by a subcarrier number/index k and an SC-FDMA symbol number/index 1.

The uplink slot includes multiple SC-FDMA symbols l (l=0, 1, . . . , $N^{UL}_{symb}$) in the time domain. $N^{UL}_{symb}$ indicates the number of SC-FDMA symbols included in one uplink slot. For a normal Cyclic Prefix (CP) in the uplink, $N^{UL}_{symb}$ is 7. For an extended CP in the uplink, $N^{UL}_{symb}$ is 6.

The terminal apparatus 1 receives the parameter UL-CyclicPrefixLength indicating the CP length in the uplink from the base station apparatus 3. The base station apparatus 3 may broadcast, in the cell, system information including the parameter UL-CyclicPrefixLength corresponding to the cell.

The uplink slot includes the multiple subcarriers k (k=0, 1, ..., $N^{UL}_{RB}*N^{RB}_{sc}$) in the frequency domain. $N^{UL}$RB is an uplink bandwidth configuration for the serving cell expressed by a multiple of $N^{RB}_{sc}$. $N^{RB}_{sc}$ is the (physical) resource block size in the frequency domain expressed by the number of subcarriers. The subcarrier spacing Δf may be 15 kHz, and $N^{RB}_{sc}$ may be 12. In other words, $N^{RB}_{sc}$ may be 180 kHz.

A resource block (RB) is used to express mapping of a physical channel to resource elements. For the resource block, a virtual resource block (VRB) and a physical resource block (PRB) are defined. A physical channel is first mapped to a virtual resource block. Thereafter, the virtual resource block is mapped to the physical resource block. One physical resource block is defined by $N^{UL}_{symb}$ consecutive SC-FDMA symbols in the time domain and by $N^{RB}_{sc}$ consecutive subcarriers in the frequency domain. Hence, one physical resource block is constituted by ($N^{UL}_{symb}*N^{RB}_{sc}$) resource elements. One physical resource block corresponds to one slot in the time domain. Physical resource blocks are numbered $n_{PRB}$ (0, $N^{UL}_{RB}$-1) in ascending order of frequencies in the frequency domain.

The downlink slot according to the present embodiment includes multiple OFDM symbols. The description of the configuration of the downlink slot will be omitted, since the configuration of the downlink slot according to the present embodiment is basically the same except that a resource grid is defined by multiple subcarriers and multiple OFDM symbols.

Configurations of apparatuses according to the present embodiment will be described below.

Figure 4:
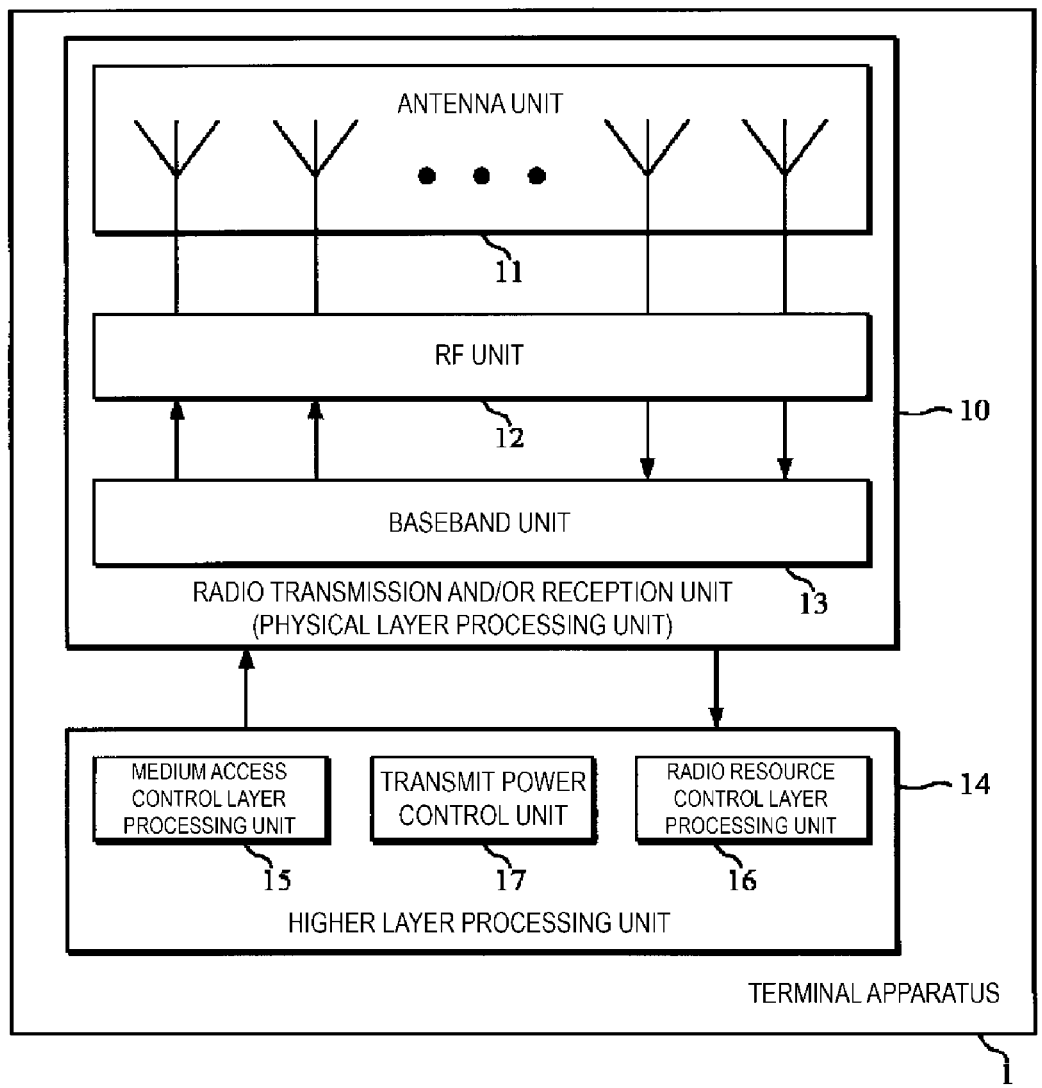
FIG. 4 is a schematic block diagram illustrating a configuration of a terminal apparatus 1 according to the present embodiment.

FIG. 4 is a schematic block diagram illustrating a configuration of the terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of the Medium Access Control layer. The medium access control layer processing unit 15 controls random access procedure in accordance with the various configuration information/parameters managed by the radio resource control layer processing unit 16.

The radio resource control layer processing unit 16 included in the higher layer processing unit 14 performs processing of the Radio Resource Control layer. The radio resource control layer processing unit 16 manages various types of configuration information/parameters of its own apparatus. The radio resource control layer processing unit 16 sets various types of configuration information/parameters based on higher layer signaling received from the base station apparatus 3. In other words, the radio resource control unit 16 sets the various configuration information/parameters in accordance with the information indicating the various configuration information/parameters received from the base station apparatus 3. The radio resource control layer processing unit 36 generates uplink data (transport block) allocated on a PUSCH, an RRC message, a MAC Control Element (CE), and the like, and outputs the generated data to the radio transmission and/or reception unit 30.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an SC-FDMA symbol by performing Inverse Fast Fourier Transform (IFFT) of the data, attaches CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

Figure 5:
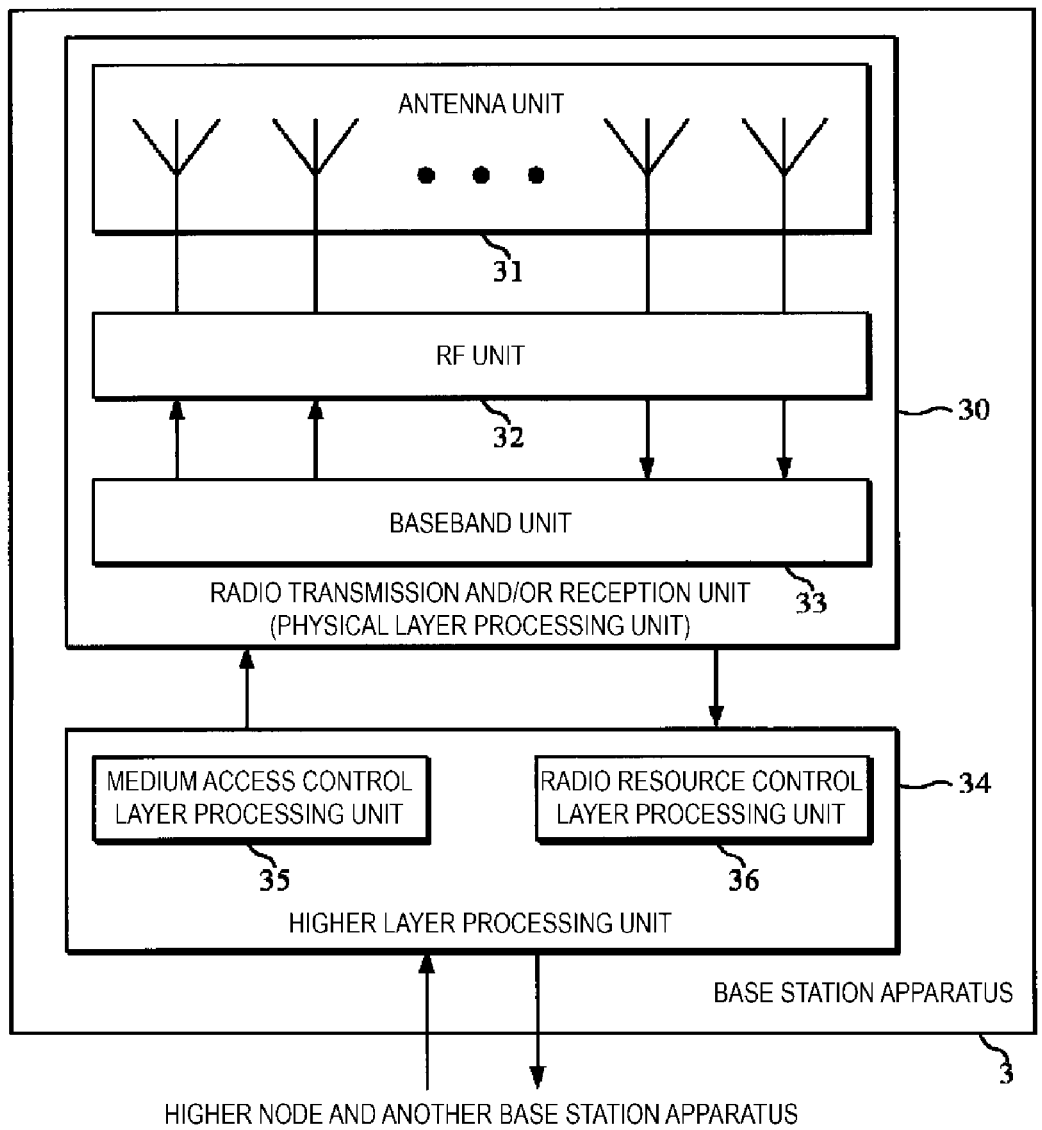
FIG. 5 is a schematic block diagram illustrating a configuration of a base station apparatus 3 according to the present embodiment.

FIG. 5 is a schematic block diagram illustrating a configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The radio resource control layer processing unit 36 included in the higher layer processing unit 34 performs processing of the Radio Resource Control layer. The radio resource control layer processing unit 36 generates, or acquires from a higher node, downlink data (transport block) allocated on a PDSCH, system information, an RRC message, a MAC Control Element (CE), and the like, and performs output to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via the higher layer signal. In other words, the radio resource control layer processing unit 36 transmits/broadcasts information indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit.

The PUSCH transmission timing will be described in detail below.

Each of DCI format 0A and DCI format 0B includes a 'PUSCH trigger A' field, and a 'Timing offset' field. DCI format 0B includes a 'number of scheduled subframes' field. The information bits on which the 'PUSCH trigger A' field is mapped is also referred to as 'PUSCH trigger A'. The value of the information bits on which 'PUSCH trigger A' field is mapped is also referred to as the value of the 'PUSCH trigger A' field. The same applies to other fields.

DCI format 1C may include an 'Uplink transmission duration and offset indication' field and/or a 'PUSCH trigger B' field.

In a case that the PDCCH including DCI format 0A including the PUSCH trigger A' field set to 0 is detected in subframe n, the terminal apparatus 1 may perform PUSCH transmission in subframe n+k+l+i (i=0, 1, . . . , N−1). In a case that the PDCCH including DCI format 0B including the 'PUSCH trigger A' field set to 0 is detected in subframe n, the terminal apparatus 1 may perform PUSCH transmission in subframe n+k+l+i (i=0, 1, . . . , N−1).

In a case that the PDCCH including DCI format 0A including the PUSCH trigger A' field set to 1 is detected in subframes from subframe n−v to subframe n−1, and the PDCCH including DCI format 1C is detected in subframe n, the terminal apparatus 1 may perform PUSCH transmission in subframe n+k+l+i (i=0, 1, . . . , N−1). In a case that the PDCCH including DCI format 0B including the 'PUSCH trigger A' field set to 1 is detected in subframes from subframe n−v to subframe n−1, and the PDCCH including DCI format 1C is detected in subframe n, the terminal apparatus 1 may perform PUSCH transmission in subframe n+k+l+i (i=0, 1, . . . , N−1). Here, the subframes from subframe n−v to subframe n−1 includes subframe n−v and/or subframe n−1. Here, the 'Uplink transmission duration and offset indication' field and/or the 'PUSCH trigger B' field included in DCI format 1C are set to particular values. For example, the PUSCH trigger B' field may be set to 1. For example, the 'Uplink transmission duration and offset indication' field may be set to a value other than a prescribed value(s). Here, the prescribed values may be 00000 and 11111. The 'Uplink transmission duration and offset indication' field and/or the 'PUSCH trigger B' field being set to particular values also refers to the 'Uplink transmission duration and offset indication' field and/or the PUSCH trigger B' field being set to trigger PUSCH transmission.

i is an integer from 0 to N−1. The value of N is an integer greater than 0. For DCI format 0A, the value of N is 1. For DCI format 0B, the value of N is determined by the 'number of scheduled subframes' field in DCI format 0B.

In a case that the 'PUSCH trigger A' field is set to 0, the value of k may be determined by the value of the 'Timing offset' field. In a case that the 'PUSCH trigger A' field is set to 1, the value of k may be determined by the values of the first and second information bits of the 'Timing offset' field.

v is the length of a validation duration. The validation duration is also referred to as a time window. In a case that the 'PUSCH trigger A' field is set to 1, the values of the third and fourth information bits of the 'Timing offset' field is used to indicate v. In a case that the 'PUSCH trigger A' field is set to 1, the 'validation duration' field may be mapped to the third and fourth information bits of the 'Timing offset' field.

In a case that the PDCCH including DCI format 0A/0B including the 'PUSCH trigger A' field set to 1 is detected in subframe n−v, and the PDCCH including DCI format 1C is not detected until subframe n, the terminal apparatus 1 may cancel PUSCH transmission corresponding to DCI format 0A/0B. Here, the 'Uplink transmission duration and offset indication' field and/or the 'PUSCH trigger B' field included in DCI format 1C is set to particular values. After the PDCCH including DCI format 0A/0B including the 'PUSCH trigger A' field set to 1 has been detected in subframe n−v, until DCI format 1C in which the 'Uplink transmission duration and offset indication' field and/or the 'PUSCH trigger B' field is set to particular values is detected, triggered PUSCH transmission is pending. After the PDCCH including DCI format 0A/0B including the 'PUSCH trigger A' field set to 1 in subframe n−v has been detected, until the PUSCH transmission is canceled, triggered PUSCH transmission is pending. In other words, the PUSCH scheduled by DCI format 0A/0B including the 'PUSCH trigger A' field set to 1 is valid in the validation duration indicated by the third and fourth information bits of the 'Timing offset' field in DCI format 0A/0B. In other words, the PUSCH scheduled by DCI format 0A/0B including the 'PUSCH trigger A' field set to 1 is valid in the validation duration indicated by the third and fourth information bits of the 'Timing offset' field in DCI format 0A/0B. In other words, the scheduling of the PUSCH triggered by DCI format 1C in which the 'Uplink transmission duration and offset indication' field and/or the 'PUSCH trigger B' field is set to particular values is valid in the validation duration.

In a case that the 'PUSCH trigger A' field is set to 0, the value of l may be a prescribed value (e.g., 4). In a case that the 'PUSCH trigger A' field is set to 1, the value of l is an uplink offset. Here, the uplink offset may be determined by the 'Uplink transmission duration and offset indication' field included in DCI format 1C.

FIGS. 6A and 6B are diagrams illustrating one example for scheduling the PUSCH according to the present embodiment. In FIGS. 6A and 6B, the horizontal axis indicates the time domain (subframe number). In each of in FIGS. 6A and 6B, there are up to one DCI format 0A/0B, up to one DCI format 1C, and up to one PUSCH. In a case that there are multiple DCI format 0A/0B, multiple DCI format 1C, and/or multiple PUSCH, an operation different from the present embodiment may be applied.

DCI format 0A/0B (600) is DCI format 0A or DCI format 0B. In FIGS. 6A and 6B, N is 1. In other words, i is 0.

In FIG. 6A, the 'PUSCH trigger A' field included in DCI format 0A/0B (600) is set to 0. DCI format 0A/0B (600) is transmitted in subframe n. The PUSCH (601) is scheduled by the uplink grant (600). The transmission of the PUSCH (601) is performed in subframe n+k+l+i. In FIG. 6A, 1 is a prescribed value (e.g., 4), and k is determined by the 'Timing offset' field included in DCI format 0A/0B (600).

DCI format 0A/0B (602) is DCI format 0A or DCI format 0B. In FIG. 6B, the 'PUSCH trigger A' field included in DCI format 0A/0B (602) is set to 1. DCI format 0A/0B (602) is transmitted in subframe n−X. Subframe n−X is between subframe n−v and subframe n. DCI format 1C (603) is transmitted in subframe n. DCI format 1C (603) is transmitted in the validation duration. The start position of the validation duration may be later subframe than subframe n−x. For example, the start position of the validation duration may be subframe n−X+1 and the end position of the validation duration may be subframe n−X+v. The length of the validation duration may be indicated by the third and fourth information bits of the 'Timing offset' field in DCI format 0A/0B (602).

The transmission of the PUSCH (604) is performed in subframe n+k+l+i. In FIG. 6B, 1 is determined at least based on the 'Uplink transmission duration and offset indication' field in DCI format 1C, and k is determined at least based on the values of the first and second information bits of the 'Timing offset' field included in DCI format 0A/0B (600).

The 'Uplink transmission duration and offset indication' field in DCI format 1C may indicate the length d of the uplink duration. For example, in FIG. 6B, the start position of the uplink duration may be subframe n+l, and the end position of the uplink duration may be subframe n+l+d−1. The terminal apparatus 1 does not need to monitor the PDCCH in the uplink duration.

Now, Discontinuous Reception (DRX) applicable to the present invention will be described.

A DRX functionality is configured by a higher layer (RRC) and processed through MAC. The DRX functionality controls a PDCCH monitoring activity of the terminal apparatus 1 for the C-RNTI and the CC-RNTI of the terminal apparatus 1.

In other words, the DRX functionality controls the monitoring activity of the terminal apparatus 1 for the PDCCH to be used to transmit a DCI format, to which CRC parity bits scrambled with the C-RNTI of the terminal apparatus 1 are attached. In other words, the DRX functionality controls the monitoring activity of the terminal apparatus 1 for the PDCCH to be used to transmit DCI format 1C, to which CRC parity bits scrambled with the CC-RNTI are attached. The DRX functionality may not be applied to the monitoring activity of the terminal apparatus 1 for the PDCCH to be used to transmit a DCI format, to which CRC parity bits scrambled with the prescribed RNTI are attached.

With the configured DRX, the terminal apparatus 1 may discontinuously monitor the PDCCHs through a DRX operation to be described below. In other cases, the terminal apparatus 1 may continuously monitor PDCCHs.

The higher layer (RRC) controls the DRX operation by configuring the following multiple timers and a drxStart-Offset value.
  onDurationTimer
  drx-InactivityTimer
  drx-RetransmissionTimer (one for each of downlink HARQ processes except for a downlink HARQ process corresponding to a broadcast process)
  drx-ULRetransmissionTimer (one for each of uplink HARQ processes)
  longDRX-Cycle
  HARQ Round Trip Time (RTT) timer (one for each of downlink HARQ processes)
  UL HARQ RTT Timer (one for each of uplink HARQ processes)
  drxShortCycleTimer
  shortDRX-Cycle The base station apparatus 3 may transmit, to the terminal apparatus 1, an RRC message including parameters/information indicating the values of onDurationTimer, drx-InactivityTimer, drx-RetransmissionTimer, drx-ULRetransmissionTimer, longDRX-Cycle, drxShortCycleTimer, shortDRX-Cycle, and drxStartOffset.

The terminal apparatus 1 may set the values of onDurationTimer, drx-InactivityTimer, drx-RetransmissionTimer, drx-ULRetransmissionTimer, longDRX-Cycle, drxShortCycleTimer, shortDRX-Cycle, and drxStartOffset, based on the received RRC message.

longDRX-Cycle and shortDRX-Cycle are also collectively referred to as a DRX cycle.

onDurationTimer indicates the number of consecutive PDCCH subframes from the start of a DRX cycle.

drx-InactivityTimer indicates the number of consecutive PDCCH subframes subsequent to the subframe, to which the PDCCH indicating initial transmission of uplink data or downlink data to the terminal apparatus 1 is mapped.

drx-RetransmissionTimer indicates the maximum number of consecutive PDCCH subframes for downlink retransmission expected by the terminal apparatus 1. The same value of drx-RetransmissionTimer is applied to all serving cells.

drx-ULRetransmissionTimer indicates the maximum number of consecutive PDCCH subframes before receiving the uplink grant (uplink HARQ retransmission grant) for uplink retransmission. To all serving cells to which non-synchronous HARQ is applied for the uplink, the same value of drx-ULRetransmissionTimer is applied.

The DRX cycle indicates an On Duration iteration cycle. An On Duration period is followed by a period in which a PDCCH monitoring inactivity of the terminal apparatus 1 for a C-RNTI and an SPS C-RNTI of the terminal apparatus 1 is enabled.

Figure 7:
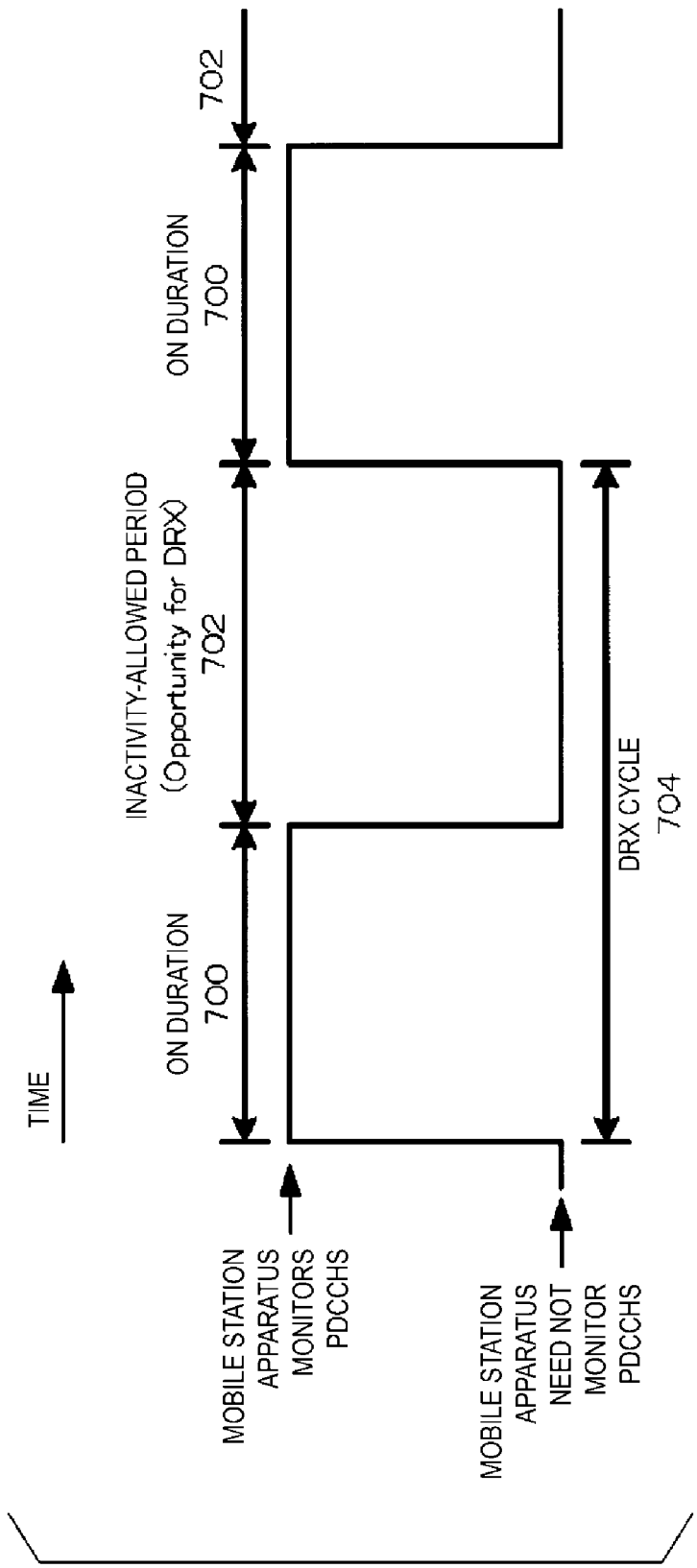
FIG. 7 is a diagram illustrating one example of a DRX cycle according to the present embodiment.

FIG. 7 is a diagram illustrating one example of a DRX cycle according to the present embodiment. In FIG. 7, the horizontal axis is a time axis. In FIG. 7, the terminal apparatus 1 monitors PDCCHs in an On Duration period P700. In FIG. 7, a period P702 subsequent to the On Duration period P700 is an inactivity-allowed period. In other words, in FIG. 7, the terminal apparatus 1 may not monitor PDCCHs in the period P702.

drxShortCycleTimer indicates the number of consecutive subframes in which the terminal apparatus 1 follows a short DRX cycle.

drxStartOffset indicates a subframe in which the DRX cycle starts.

An HARQ RTT timer corresponding to a downlink HARQ process relates to the start of a drx-Retransmission-Timer and is managed for each downlink HARQ process.

The HARQ RTT timer corresponding to the downlink HARQ process indicates the minimum interval from transmission of downlink data to retransmission of the downlink data. In other words, the HARQ RTT timer corresponding to the downlink HARQ process indicates the minimum number of subframes prior to downlink HARQ retransmission expected by the terminal apparatus 1.

Note that, according to the present embodiment, one downlink HARQ process controls the HARQ of one piece of downlink data (a transport block). Alternatively, one downlink HARQ process may control two pieces of downlink data.

The UL HARQ RTT timer corresponding to an uplink HARQ process relates to the start of the drx-ULRetransmissionTimer and is managed for each uplink HARQ process. The UL HARQ RTT timer corresponding to the uplink HARQ process indicates the minimum interval from transmission of uplink data to transmission of the uplink grant (uplink HARQ retransmission grant) for retransmission of the uplink data. In other words, the UL HARQ RTT timer corresponding to the uplink HARQ process indicates the minimum amount of subframes prior to the uplink grant (uplink HARQ retransmission grant) for uplink retransmission expected by the terminal apparatus 1.

The same active time may be applied to all serving cells.

A different active time may be applied to each of serving cells belonging to the first cell group and serving cells belonging to the second cell group. Here, the same active time may be applied to all serving cells belonging to the first cell group. Here, the same active time may be applied to all serving cells belonging to the second cell group. In other words, in each of the first cell group and the second cell group, DRX may be controlled individually. In other words, to each of the first cell group and the second cell group, the values of onDurationTimer, drx-InactivityTimer, drx-RetransmissionTimer, drx-ULRetransmissionTimer, longDRX-Cycle, drxShortCycleTimer, shortDRX-Cycle, and drxStartOffset may be set individually. Here, the first cell group may only include one or multiple LAA cells. Here, the second cell group may include one or multiple cells X and 0 or more LAA cells. Here, the cells X is are cells other than the LAA cells. The base station apparatus 3 may transmit, to the terminal apparatus 1, an RRC message including parameter/information to indicate the first cell group or the second cell group to which a LAA cell belongs. The terminal apparatus 1 may identify the first cell group or the second cell group to which the LAA cell belongs, based on the received RRC message.

For example, in a case that the DRX cycle is configured, an Active Time may include a period satisfying at least one of the condition (a) to the condition (d) below.

Condition (a): onDurationTimer, drx-InactivityTimer, drx-RetransmissionTimer, drx-ULRetransmissionTimer, or mac-ContentionResolutionTimer is running Condition (b): a scheduling request is transmitted on a PUCCH and is pending Condition (c): there is a possibility that an uplink grant for pending HARQ retransmission is transmitted for synchronous HARQ, and the corresponding HARQ buffer holds data Condition (d): after successful reception of a random access response for a preamble that is not selected by the terminal apparatus 1, a PDCCH, which is accompanied with the C-RNTI of the terminal apparatus 1 and which indicates that initial transmission has not been received Note that the conditions used to determine whether a certain period is included in an Active Time are not limited to the condition (a) to the condition (d), one or more conditions different from the condition (a) to the condition (d) may be used, or some of the condition (a) to the condition (d) may be used.

Once a timer starts, the timer keeps running until the timer is stopped or the timer expires. In other cases, the timer is not running. When the timer is not running, the timer has a possibility to be started. When the timer is running, the timer has a possibility to be restarted. The timer is always to be started or restarted from an initial value of the timer.

The preamble serves as a message 1 in a random access procedure, and is transmitted on a PRACH. The preamble that is not selected by the terminal apparatus 1 relates to a contention-based random access procedure.

The random access response serves as a message 2 in the random access procedure, and is transmitted on a PDSCH. The base station apparatus 3 transmits a random access response to the received preamble.

The terminal apparatus 1 performing the contention-based random access procedure receives the random access response, and then transmits a message 3. After transmitting the message 3, the terminal apparatus 1 monitors a PDCCH relating to a message 4.

mac-ContentionResolutionTimer indicates the number of consecutive subframes in which the terminal apparatus 1 monitors the PDCCH after the transmission of the message 3.

Figure 8:
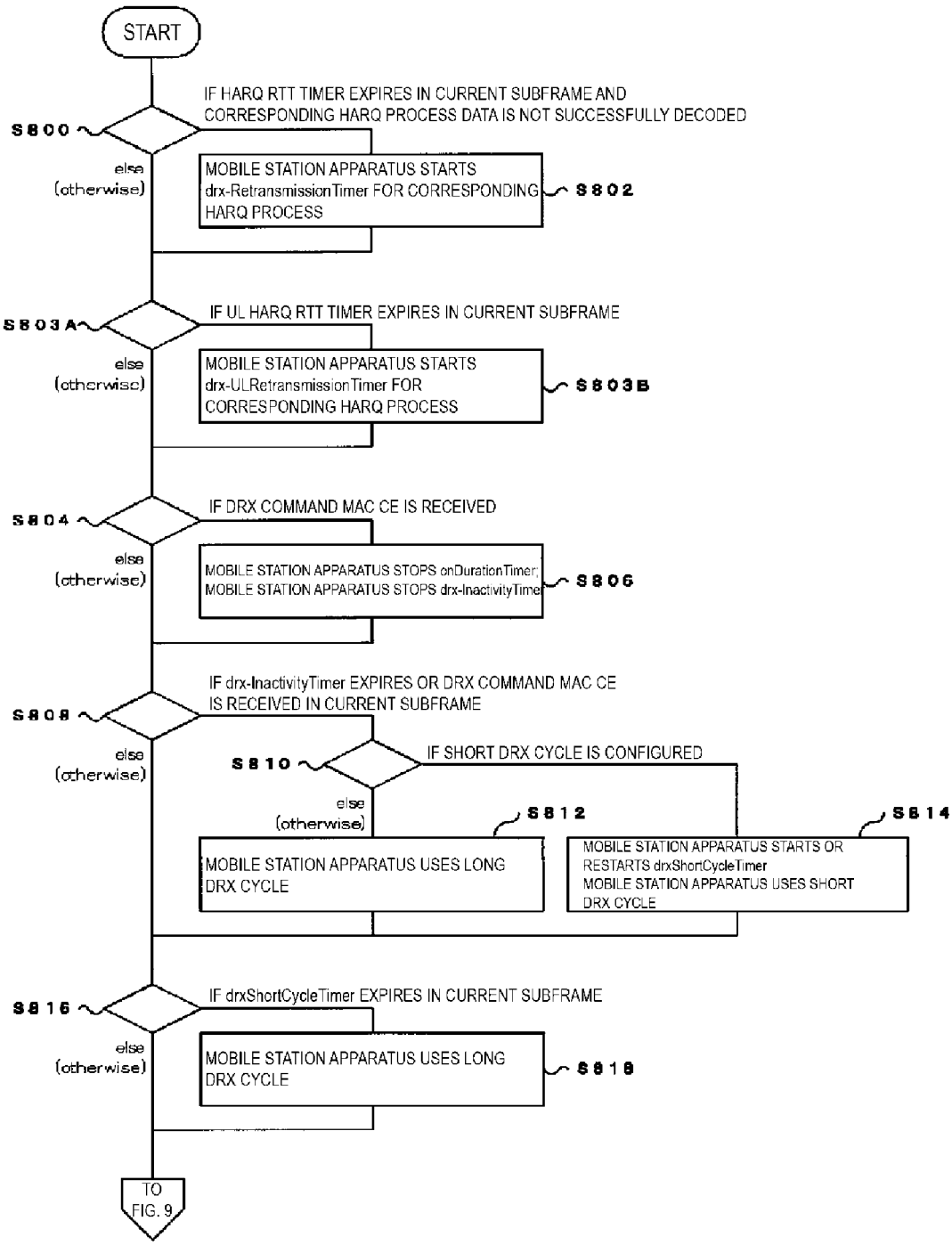
FIG. 8 is a flowchart illustrating one example of a DRX operation according to the present embodiment.
Figure 9:
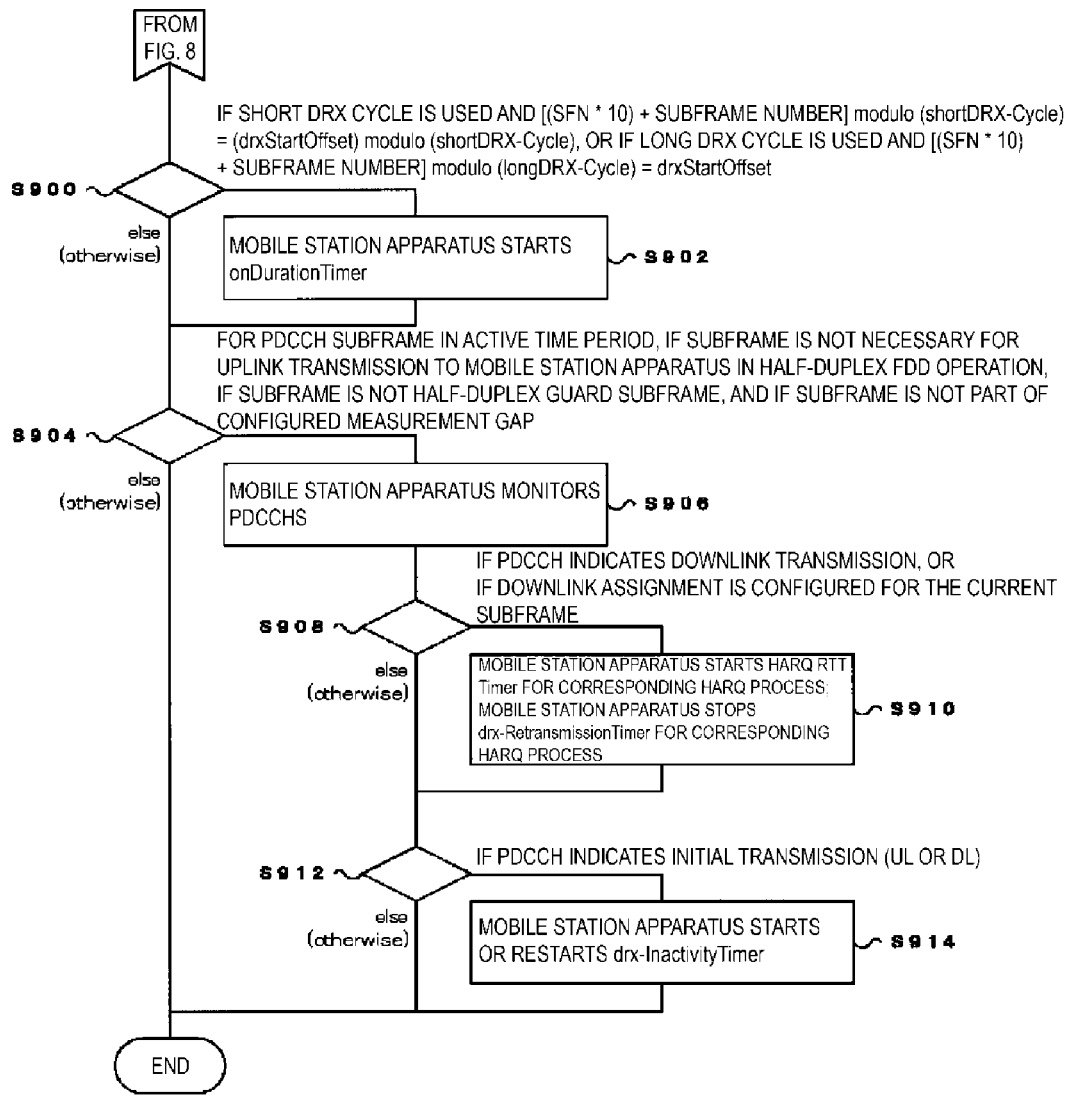
FIG. 9 is a flowchart illustrating the one example of the DRX operation according to the present embodiment.

FIG. 8 and FIG. 9 are flowcharts illustrating one example of a DRX operation according to the present embodiment. In a case that the DRX is configured, the terminal apparatus 1 performs the DRX operation for each of the subframes according to the flowcharts in FIG. 8 and FIG. 9.

In a case that a HARQ RTT timer corresponding to the downlink HARQ process in the current subframe expires and the data of the HARQ process corresponding to the HARQ RTT timer is not decoded successfully (S800), the terminal apparatus 1 starts a drx-RetransmissionTimer for the downlink HARQ process corresponding to the HARQ RTT timer (S802) and processing proceeds to S803A. Otherwise (S800), processing of the terminal apparatus 1 proceeds to S803A.

In a case that a UL HARQ RTT timer corresponding to the HARQ process of the uplink expires in this subframe (S803A), the terminal apparatus 1 starts the drx-ULRetransmissionTimer for the HARQ process of the uplink corresponding to the UL HARQ RTT timer (S803B) and processing proceeds to S804. Otherwise (S803A), processing of the terminal apparatus 1 proceeds to S804.

In a case that a DRX command MAC CE is received (S804), the terminal apparatus 1 stops an onDurationTimer and a drx-InactivityTimer (S806), and processing proceeds to S808. Otherwise (S804), processing of the terminal apparatus 1 proceeds to S808.

In a case that the drx-InactivityTimer expires or a DRX command MAC CE is received in the current subframe (S808), processing of the terminal apparatus 1 proceeds to S810. Otherwise (S808), processing of the terminal apparatus 1 proceeds to S816.

In a case that a short DRX-Cycle is not configured (S810), the terminal apparatus 1 uses a long DRX cycle (S812), and processing proceeds to S816. In a case that the short DRX-Cycle is configured (S810), the terminal apparatus 1 starts or restarts a drxShortCycleTimer to use the short DRX-Cycle (S814) and processing proceeds to S816.

In a case that the drxShortCycleTimer expires in the current subframe (S816), the terminal apparatus 1 uses the long DRX cycle (S818) and processing proceeds to S900 in FIG. 9. Otherwise (S816), processing of the terminal apparatus 1 proceeds to S900 in FIG. 9.

(1) In a case that the short DRX-Cycle is used and [(SFN*10)+subframe number] modulo (shortDRX-Cycle)= (drxStartOffset) modulo (shortDRX-Cycle), or (2) in a case that the long DRX-Cycle is used and [(SFN*10)+subframe number] modulo (longDRX-Cycle)=drxStartOffset (S900), the terminal apparatus 1 starts an onDurationTimer (S902) and processing proceeds to S904. Otherwise (S900), processing of the terminal apparatus 1 proceeds to S904.

In a case that all conditions (e) to (j) below are satisfied (S904), the terminal apparatus 1 monitors the PDCCH in the current subframe (906) and processing proceeds to S908.

Condition (e): the current subframe is included in an Active Time period

Condition (f): the current subframe is a PDCCH subframe

Condition (g): the current subframe is not necessary for uplink transmission to the terminal apparatus 1 in a half-duplex FDD operation Condition (h): the subframe is not a half-duplex guard subframe Condition (i): the current subframe is not a part of a configured measurement gap Condition (j): the current subframe is not a part of the uplink duration d For one FDD serving cell, all subframes may be PDCCH subframes. For one LAA cell, all subframes may be PDCCH subframes. The terminal apparatus 1 and the base station apparatus 3 may identify a PDCCH subframe for a TDD serving cell, based on the UL-DL configuration. The terminal apparatus 1 for communicating with the base station apparatus 3 through one TDD serving cell, and the base station apparatus 3 may identify (select or determine), as a PDCCH subframe, the subframe indicated as a downlink subframe or a subframe including DwPTS in the UL-DL configuration corresponding to the serving cell.

The half-duplex FDD operation includes a type A half-duplex FDD operation and a type B half-duplex FDD operation. The terminal apparatus 1 may transmit information indicating whether to support the type A half-duplex FDD in the FDD band, to the base station apparatus 3. The terminal apparatus 1 may transmit information indicating whether to support the type B half-duplex FDD in the FDD band, to the base station apparatus 3.

In the type A half-duplex FDD operation, the terminal apparatus 1 is not capable of performing uplink transmission and downlink reception simultaneously.

In the type B half-duplex FDD operation, a subframe immediately before the subframe in which the terminal apparatus 1 performs uplink transmission and a subframe immediately after the subframe in which the mobile station apparatus 1 performs uplink transmission are each a half-duplex guard subframe.

In the type B half-duplex FDD operation, the terminal apparatus 1 is not capable of performing uplink transmission and downlink reception simultaneously. In the type B half-duplex FDD operation, the terminal apparatus 1 is not capable of performing downlink reception in a subframe immediately before the subframe in which the terminal apparatus 1 performs uplink transmission. For the type B half-duplex FDD operation, the terminal apparatus 1 is not capable of performing downlink reception in a subframe immediately after the subframe in which the terminal apparatus 1 performs uplink transmission.

The measurement gap is a time interval for the terminal apparatus 1 to perform measurements of cells operating on different frequencies and/or operating in different Radio Access Technologies (RATs). The base station apparatus 3 transmits information indicating the period of the measurement gap to the terminal apparatus 1. The terminal apparatus 1 configures the period of the measurement gap, based on the information.

The uplink duration d may be determined at least based on the 'Uplink transmission duration and offset indication' field included in DCI format 1C.

In a case that at least one of the conditions (e) to (j) is not satisfied (S904), the terminal apparatus 1 terminates the DRX operation for the current subframe. In other words, when at least one of the conditions (e) to (j) is not satisfied, the terminal apparatus 1 need not monitor the PDCCH in the current subframe.

Note that the conditions used in S904 are not limited to the condition (e) to the condition (j). In S904, conditions different from the condition (e) to the condition (j) or some of the condition (e) to the condition (j) may be used.

In a case that the downlink assignment received via the PDCCH indicates downlink transmission or in a case that a downlink assignment is configured for the current subframe (S908), the terminal apparatus 1 starts the HARQ RTT timer for the corresponding downlink HARQ process and stops a drx-RetransmissionTimer for the corresponding downlink HARQ process (S910), and processing proceeds to step S911A. Otherwise (S908), processing of the terminal apparatus 1 proceeds to S911A. Here, the length of the HARQ RTT timer may be 8.

The state in which a downlink assignment is configured denotes a state in which semi persistent scheduling is activated by the downlink assignment along with an SPS C-RNTI.

In a case that the uplink grant received via the PDCCH indicates uplink transmission for the non-synchronous HARQ process (S911A), the terminal apparatus 1 (i) starts the UL HARQ RTT timer for the HARQ process of the uplink corresponding to the uplink grant in the subframe including PUSCH transmission corresponding to the uplink grant, and (ii) stops drx-ULRetransmissionTimer for the HARQ process of the uplink corresponding to the uplink grant (S911B), and (iii) processing proceeds to step S912. Otherwise (S911A), processing of the terminal apparatus 1 proceeds to S912. Here, the length of the UL HARQ RTT timer may be 4.

In a case that the downlink assignment or the uplink grant received via the PDCCH indicates initial downlink or uplink transmission (S912), the terminal apparatus 1 starts or restarts the drx-InactivityTimer (S914) and terminates the DRX operation for the current subframe. Otherwise (S912), the terminal apparatus 1 terminates the DRX operation for the current subframe.

However, in the duration that is the validation duration indicated by DCI format 0A/0B and is not active time in the above described DRX, DCI format 1C to which the CRC parity bits scrambled with the CC-RNTI are attached may not be monitored.

Figure 10:
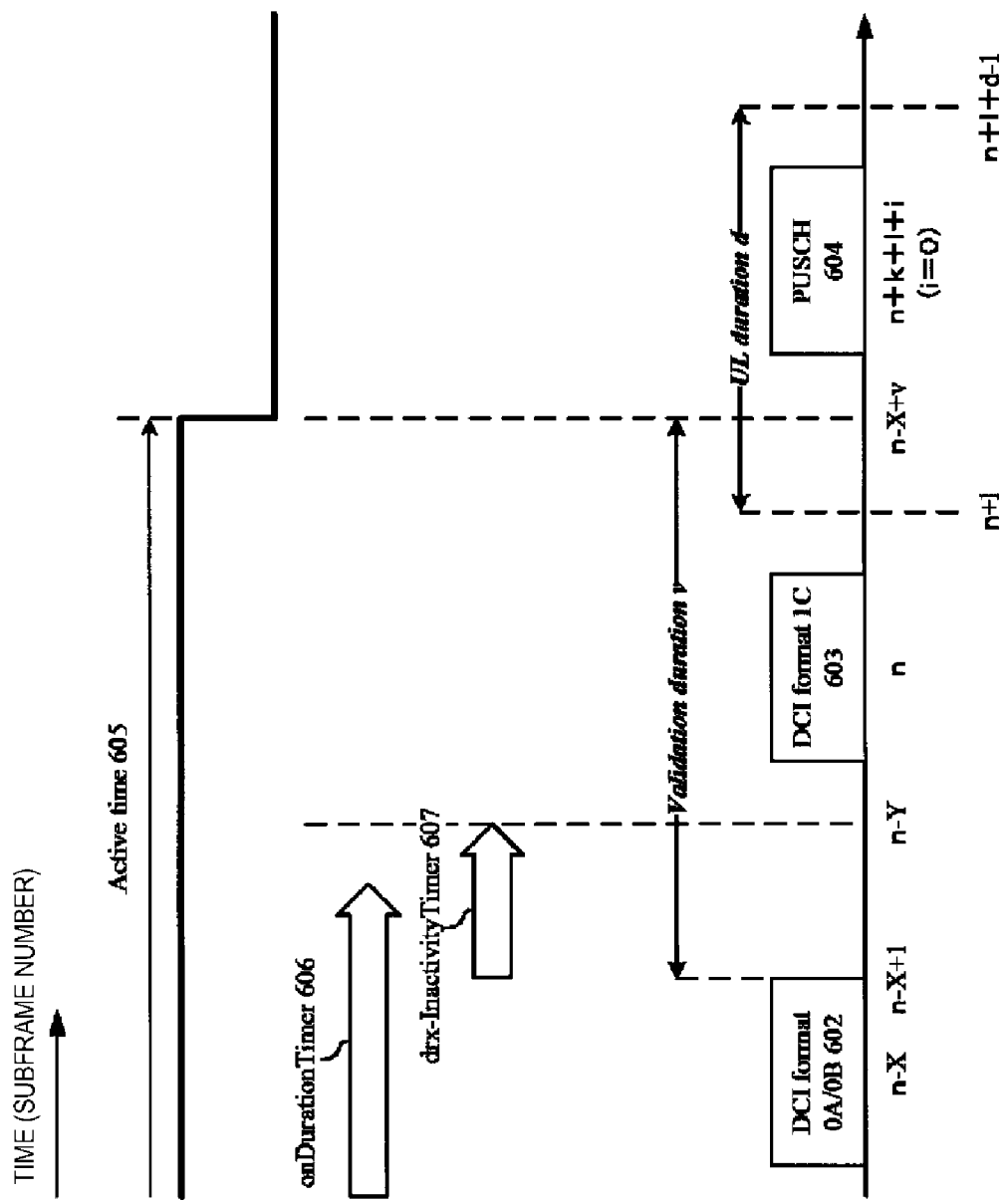
FIG. 10 is a diagram illustrating a first example of an active time according to the present embodiment.

Thus, in one aspect of the present embodiment, the active time may further include the validation duration indicated by the validation duration indicated by DCI format 0A/0B. FIG. 10 is a diagram illustrating a first example of an active time according to the present embodiment. DCI format 0A/0B (602), DCI format 1C (603) and the PUSCH 604 in FIG. 10 are the same as DCI format 0A/0B (602), DCI format 1C (603) and the PUSCH (604) in FIGS. 6A and 6B. Here, DCI format 0A/0B (602) indicates initial transmission of the PUSCH. In FIG. 10, the active time (605) includes (i) the duration in which the onDurationTimer (606) or the drx-InactivityTimer (607) is running and (ii) the validation duration indicated by DCI format 0A/0B. In FIG. 10, in the duration that is the active time (605) and is the uplink duration (from subframe n+l to subframe n−X+v), the terminal apparatus 1 does not need to monitor the PDCCH for the C-RNTI and the CC-RNTI. With this configuration, the terminal apparatus 1 can efficiently monitor the PDCCH for the CC-RNTI.

Figure 11:
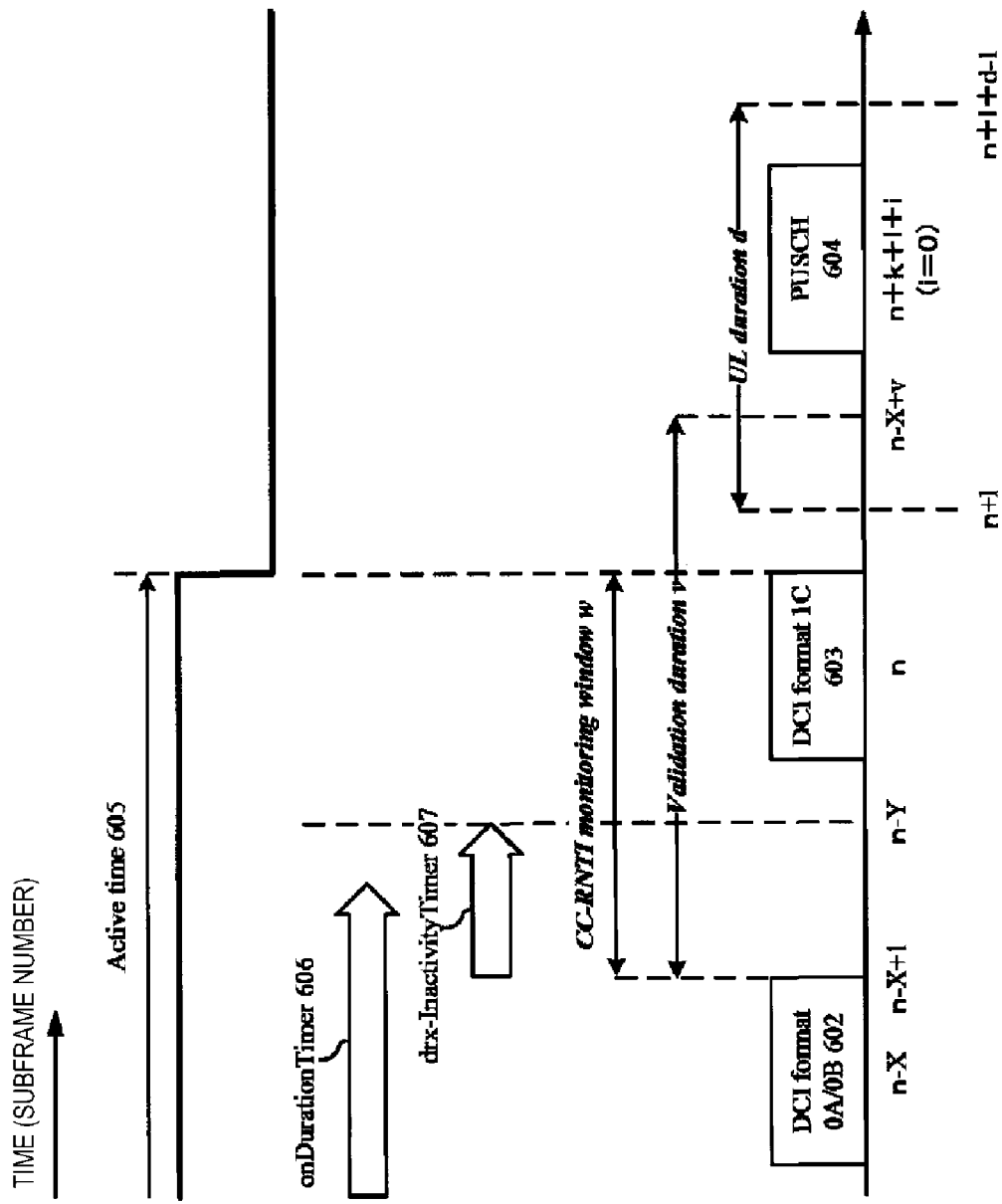
FIG. 11 is a diagram illustrating a second example of an active time according to the present embodiment.

In another aspect of the present embodiment, the active time may further include a CC-RNTI monitoring window. FIG. 11 is a diagram illustrating a second example of an active time according to the present embodiment. DCI format 0A/0B (602), DCI format 1C (603) and the PUSCH (604) in FIG. 11 are the same as DCI format 0A/0B (602), DCI format 1C (603) and the PUSCH (604) in FIGS. 6A and 6B. Here, DCI format 0A/0B (602) indicates initial transmission of the PUSCH. In FIG. 11, the active time (605) includes (i) the duration in which the onDurationTimer (606) or the drx-InactivityTimer (607) is running and (ii) the CC-RNTI monitoring window.

The CC-RNTI monitoring window may be the duration in which the PUSCH transmission (604) scheduled by DCI format 0A/0B (602) is pending. The PUSCH transmission (604) scheduled by DCI format 0A/0B (602) may be canceled based on the detection of DCI format 1C (603). The PUSCH transmission (604) scheduled by DCI format 0A/0B (602) may be canceled based on the end of the validation duration. The CC-RNTI monitoring window may include subframes from subframe n−X+1 subsequent to subframe n−X in which DCI format 0A/0B (602) is transmitted, to subframe n in which DCI format 1C (603) is transmitted. With this configuration, the terminal apparatus 1 can efficiently monitor the PDCCH for the C-RNTI and the CC-RNTI.

Figure 12:
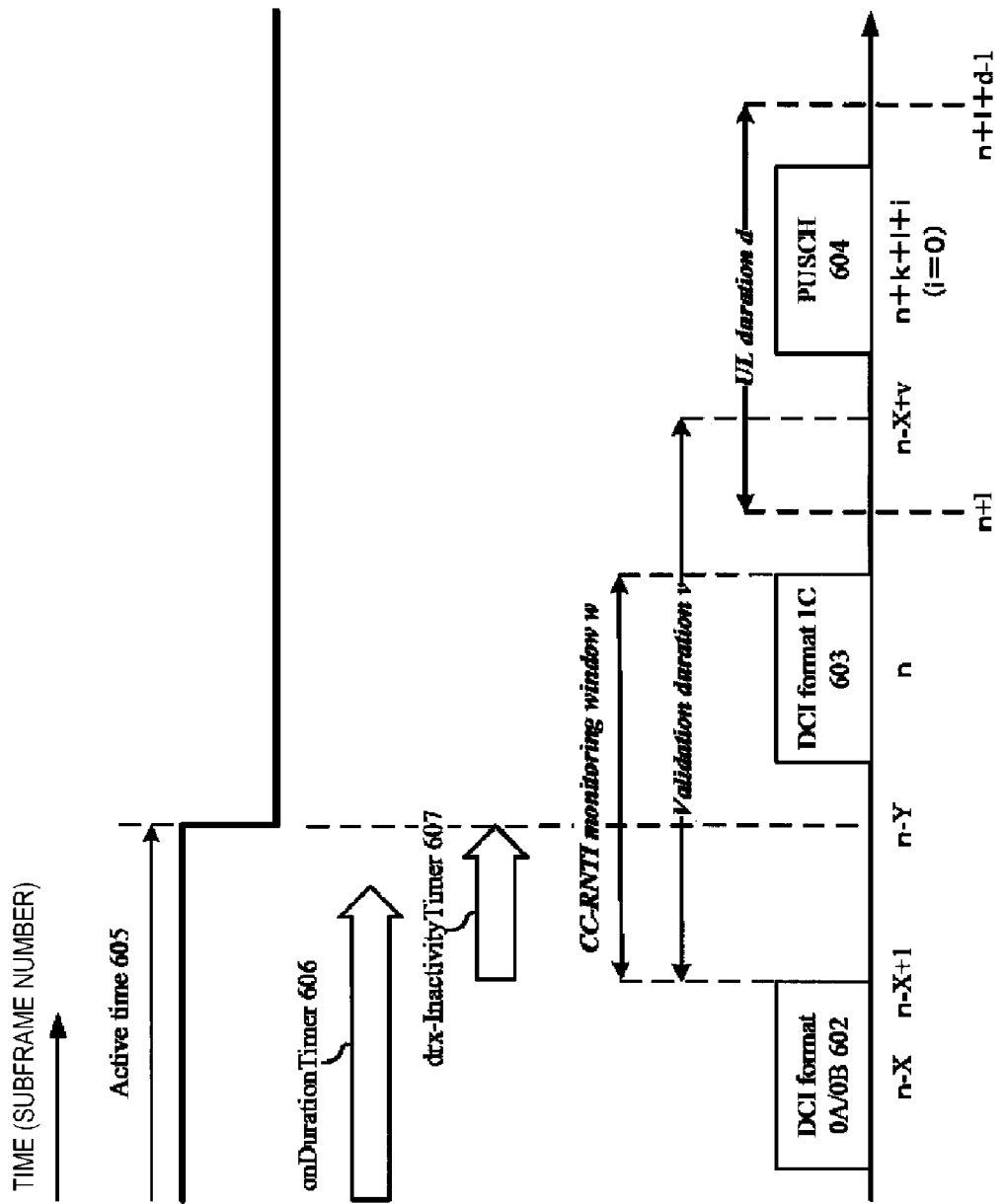
FIG. 12 is a diagram illustrating a third example of an active time according to the present embodiment.

In yet another aspect of the present embodiment, the active time does not need to include the validation duration indicated by DCI format 0A/0B and the CC-RNTI monitoring window. FIG. 12 is a diagram illustrating a third example of an active time according to the present embodiment. DCI format 0A/0B (602), DCI format 1C (603) and the PUSCH (604) in FIG. 12 are the same as DCI format 0A/0B (602), DCI format 1C (603) and the PUSCH (604) in FIGS. 6A and 6B. Here, DCI format 0A/0B (602) indicates initial transmission of the PUSCH. In FIG. 12, the active time (605) includes (i) the duration in which the onDurationTimer (606) or the drx-InactivityTimer (607) is running. The CC-RNTI monitoring window in FIG. 12 is the same as the CC-RNTI monitoring window in FIG. 11.

In FIG. 12, during the active time (605) or during the validation duration, the terminal apparatus 1 may monitor the PDCCH used for transmission of DCI format 1C to which the CRC parity bits scrambled with the CC-RNTI are attached. In FIG. 12, during the active time (605), the terminal apparatus 1 may monitor the PDCCH used for transmission of the DCI format to which the CRC parity bits scrambled with the C-RNTI of the terminal apparatus 1 are attached. In FIG. 12, during the duration that is not the active time (605) but the validation duration, the terminal apparatus 1 does not need to monitor the PDCCH used for transmission of the DCI format to which the CRC parity bits scrambled with the C-RNTI of the terminal apparatus 1 are attached. With this configuration, the terminal apparatus 1 can efficiently monitor the PDCCH for the C-RNTI and the CC-RNTI.

In FIG. 12, during the active time (605) or during the CC-RNTI monitoring window, the terminal apparatus 1 may monitor the PDCCH used for transmission of DCI format 1C to which the CRC parity bits scrambled with the CC-RNTI are attached. In FIG. 12, during the active time (605), the terminal apparatus 1 may monitor the PDCCH used for transmission of the DCI format to which the CRC parity bits scrambled with the C-RNTI of the terminal apparatus 1 are attached. In FIG. 12, during the duration that is not the active time (605) but the CC-RNTI monitoring window, the terminal apparatus 1 does not need to monitor the PDCCH used for transmission of the DCI format to which the CRC parity bits scrambled with the C-RNTI of the terminal apparatus 1 are attached. With this configuration, the terminal apparatus 1 can efficiently monitor the PDCCH for the C-RNTI and the CC-RNTI.

Various aspects of the terminal apparatus 1 according to the present embodiment will be described below.

(1) A first aspect of the present embodiment provides the terminal apparatus 1 performing the discontinuous reception (DRX) controlling the physical downlink control channel (PDCCH) monitoring activity for the cell radio network temporary identifier (C-RNTI) and the common control radio network temporary identifier (CC-RNTI), the terminal apparatus 1 including the receiver 10 configured to and/or programmed to monitor the PDCCH for the C-RNTI and the CC-RNTI during the active time; and the transmitter 10 configured to and/or programmed to transmit the physical uplink shared channel (PUSCH) in the subframe n+k+l, in a case that the first PDCCH including the first downlink control information in the subframe n−X is detected and the second PDCCH including the second downlink control information in the subframe n is detected. The active time includes at least the CC-RNTI monitoring window. The CC-RNTI monitoring window is started based on the detection of first PDCCH including the first downlink control information in the subframe n−X. The CC-RNTI monitoring window is ended based on the detection of the second PDCCH including the second downlink control information in the subframe n.

(2) A second aspect of the present embodiment provides the base station apparatus 3 for communicating with a terminal apparatus performing the discontinuous reception (DRX) controlling the physical downlink control channel (PDCCH) monitoring activity for the cell radio network temporary identifier (C-RNTI) and the common control radio network temporary identifier (CC-RNTI), the base station apparatus 3 including the transmitter 30 configured to and/or programmed to transmit the PDCCH for the C-RNTI and the CC-RNTI during the active time; and the receiver 30 configured to and/or programmed to receive the physical uplink shared channel (PUSCH) in the subframe n+k+l, in a case that the first PDCCH including the first downlink control information in the subframe n−X is transmitted and the second PDCCH including the second downlink control information in the subframe n is transmitted. The active time includes at least the CC-RNTI monitoring window. The CC-RNTI monitoring window is started based on the detection of first PDCCH including the first downlink control information in the subframe n−X. The CC-RNTI monitoring window is ended based on the detection of the second PDCCH including the second downlink control information in the subframe n.

(3) In the first and second aspects of the present embodiment, the first downlink control information may be DCI format 0A or DCI format 0B, and the second downlink control information may be DCI format 1C.

(4) In the first and second aspects of the present embodiment, in a case that the second PDCCH including the second downlink control information is not detected, the CC-RNTI monitoring window ends after a prescribed time, and the prescribed time is given at least based on the 'Timing offset' field in the first downlink control information. Here, the prescribed time may be the above described validation duration.

(5) In the first and second aspects of the present embodiment, the value of k is given at least based on the 'Timing offset' field in the first downlink control information, and the value of l is given at least based on the 'Uplink transmission duration and offset indication' field in the second downlink control information.

(6) In the first and second aspects of the present embodiment, the first downlink control information includes the 'PUSCH trigger A' field set to '1', and the second downlink control information includes the 'Uplink transmission duration and offset indication' field set to a specific first value and/or the 'PUSCH trigger B' field set to a specific second value.

(7) In the first and second aspects of the present embodiment, the first CRC parity bits attached to the first downlink control information are scrambled with the C-RNTI, and the second CRC parity bits attached to the second downlink control information are scrambled with the CC-RNTI.

(8) In the first and second aspects of the present embodiment, the first downlink control information includes information to indicate resource block allocation for the PUSCH, and the second downlink control information does not include information to indicate resource block allocation for the PUSCH.

(A1) One aspect of the present invention provides a terminal apparatus including: a transmitter configured to and/or programmed to transmit a physical uplink shared channel (PUSCH) in a subframe n+k+l in a case that a first physical downlink control channel (PDCCH) with first downlink control information is detected in a subframe n–X and a second PDCCH with second downlink control information is detected in a subframe n, the first downlink control information including a 'PUSCH trigger A' field which is set to '1', the second downlink control information including a 'PUSCH trigger B' field which is set to a specific second value; and a medium access control layer processing unit configured to and/or programmed to perform discontinuous reception (DRX) which controls monitoring activity of a PDCCH for a cell radio network temporary identifier (C-RNTI) and a PDCCH for a common control radio network temporary identifier (CC-RNTI). The first PDCCH is the PDCCH for the C-RNTI, and the second PDCCH is the PDCCH for the CC-RNTI. During active time related to the DRX, at least both the PDCCH for the C-RNTI and the PDCCH for the CC-RNTI are monitored by the terminal apparatus. During a CC-RNTI monitoring window except for the active time, the PDCCH for the CC-RNTI is monitored by the terminal apparatus. The CC-RNTI monitoring window is started in a subframe n–X+l. The CC-RNTI monitoring window is ended in the subframe n in which the second PDCCH is detected in a case that the second PDCCH is detected in or until a subframe n–X+v. The CC-RNTI monitoring window is ended in the subframe n–X+v in a case that the second PDCCH is not detected in or until the subframe n–X+v. The v is given based on a 'Timing offset' field included in the first downlink control information.

(A2) One aspect of the present invention provides a communication method used for a terminal apparatus, the communication method including the steps of: transmitting a physical uplink shared channel (PUSCH) in a subframe n+k+l in a case that a first physical downlink control channel (PDCCH) with first downlink control information is detected in a subframe n–X and a second PDCCH with second downlink control information is detected in a subframe n, the first downlink control information including a 'PUSCH trigger A' field which is set to '1', the second downlink control information including a 'PUSCH trigger B' field which is set to a specific second value; and performing discontinuous reception (DRX) which controls monitoring activity of a PDCCH for a cell radio network temporary identifier (C-RNTI) and a PDCCH for a common control radio network temporary identifier (CC-RNTI). The first PDCCH is the PDCCH for the C-RNTI, and the second PDCCH is the PDCCH for the CC-RNTI. During active time related to the DRX, at least both the PDCCH for the C-RNTI and the PDCCH for the CC-RNTI are monitored. During a CC-RNTI monitoring window except for the active time, the PDCCH for the CC-RNTI is monitored. The CC-RNTI monitoring window is started in a subframe n–X+l. The CC-RNTI monitoring window is ended in the subframe n in which the second PDCCH is detected in a case that the second PDCCH is detected in or until a subframe n–X+v. The CC-RNTI monitoring window is ended in the subframe n–X+v in a case that the second PDCCH is not detected in or until the subframe n–X+v. The v is given based on at least a 'Timing offset' field included in the first downlink control information.

(A3) In one aspect of the present invention, the k is given based on at least the 'Timing offset' field, and the l is given based on at least an 'Uplink transmission duration and offset indication' field included in the second downlink control information.

According to the above, the terminal apparatus 1 can efficiently monitor the downlink.

Each of a program running on a base station apparatus 3 and a terminal apparatus 1 according to one aspect of the present invention may be a program that controls a Central Processing Unit (CPU) and the like, such that the program causes a computer to operate in such a manner as to enable the functions of the above-described embodiment according to one aspect of the present invention. The information handled in these apparatuses is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially implemented by a computer. In that case, this configuration may be implemented by recording a program for enabling such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to enable some of the functions described above, and also may be configured to be capable of enabling the functions described above in combination with a program already recorded in the computer system.

Furthermore, the base station apparatus 3 according to the above-described embodiment may be implemented as an aggregation (an apparatus group) constituted of multiple apparatuses. Each of the apparatuses configuring such an apparatus group may include some or all portions of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically implemented as an LSI which is an integrated circuit or may be implemented as a chip set. The functional blocks of each of the terminal apparatus 1 and the base station apparatus 3 may be individually implemented as a chip, or some or all of the functional blocks may be integrated into a chip. Furthermore, a circuit integration technique is not limited to the LSI, and may be implemented with a dedicated circuit or a general-purpose processor. Furthermore, in a case that a circuit integration technology that replaces the LSI develops as the semiconductor technology advances, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

One aspect of the present invention can be used, for example, in a communication system, communication equipment (e.g., a mobile telephone apparatus, a base station apparatus, a wireless LAN apparatus, or a sensor device), an integrated circuit (e.g., a communication chip) or a program, and the like.

REFERENCE SIGNS LIST 1 (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus comprising:
a transmitter configured to and/or programmed to transmit a physical uplink shared channel in a subframe n+k+l in a case that a first physical downlink control channel with first downlink control information is detected in a subframe n−X and a second physical downlink control channel with second downlink control information is detected in a subframe n, the first downlink control information including a 'PUSCH trigger A' field which is set to '1', the second downlink control information including a 'PUSCH trigger B' field which is set to a specific second value; and
a medium access control layer processing unit configured to and/or programmed to perform discontinuous reception which controls monitoring activity of a physical downlink control channel for a cell radio network temporary identifier and a physical downlink control channel for a common control radio network temporary identifier,
wherein
the first physical downlink control channel is the physical downlink control channel for the cell radio network temporary identifier,
the second physical downlink control channel is the physical downlink control channel for the common control radio network temporary identifier,
during active time related to the discontinuous reception, at least both the physical downlink control channel for the cell radio network temporary identifier and the physical downlink control channel for the common control radio network temporary identifier are monitored by the terminal apparatus,
during a common control radio network temporary identifier monitoring window except for the active time, the physical downlink control channel for the common control radio network temporary identifier is monitored by the terminal apparatus,
the common control radio network temporary identifier monitoring window is started in a subframe n−X+1,
the common control radio network temporary identifier monitoring window is ended in the subframe n in which the second physical downlink control channel is detected in a case that the second physical downlink control channel is detected in or until a subframe n−X+v, the common control radio network temporary identifier monitoring window is ended in the subframe n−X+v in a case that the second physical downlink control channel is not detected in or until the subframe n−X+v, and the v is given based on a 'Timing offset' field included in the first downlink control information.

2. The terminal apparatus according to claim 1, wherein the k is given based on at least the 'Timing offset' field, and the l is given based on at least a 'Uplink transmission duration and offset indication' field included in the second downlink control information.

3. A communication method used for a terminal apparatus, the communication method comprising:

transmitting a physical uplink shared channel in a subframe n+k+l in a case that a first physical downlink control channel with first downlink control information is detected in a subframe n-X and a second physical downlink control channel with second downlink control information is detected in a subframe n, the first downlink control information including a 'PUSCH trigger A' field which is set to '1', the second downlink control information including a 'PUSCH trigger B' field which is set to a specific second value; and performing discontinuous reception which controls monitoring activity of a physical downlink control channel for a cell radio network temporary identifier and a physical downlink control channel for a common control radio network temporary identifier, wherein the first physical downlink control channel is the physical downlink control channel for the cell radio network temporary identifier, the second physical downlink control channel is the physical downlink control channel for the common control radio network temporary identifier, during active time related to the discontinuous reception, at least both the physical downlink control channel for the cell radio network temporary identifier and the physical downlink control channel for the common control radio network temporary identifier are monitored, during a common control radio network temporary identifier monitoring window except for the active time, the physical downlink control channel for the common control radio network temporary identifier is monitored, the common control radio network temporary identifier monitoring window is started in a subframe n−X+l, the common control radio network temporary identifier monitoring window is ended in the subframe n in which the second physical downlink control channel is detected in a case that the second physical downlink control channel is detected in or until a subframe n−X+v, the common control radio network temporary identifier monitoring window is ended in the subframe n−X+v in a case that the second physical downlink control channel is not detected in or until the subframe n−X+v, and the v is given based on a 'Timing offset' field included in the first downlink control information.

4. The communication method according to claim 3, wherein the k is given based on at least the 'Timing offset' field, and the l is given based on at least a 'Uplink transmission duration and offset indication' field included in the second downlink control information.

* * * * *